United States Patent
Yoshihara et al.

(10) Patent No.: US 8,731,554 B2
(45) Date of Patent: May 20, 2014

(54) CELL RESELECTING METHOD AND MOBILE STATION DEVICE

(75) Inventors: Akio Yoshihara, Osaka (JP); Shinichi Sawada, Osaka (JP); Shigeto Suzuki, Osaka (JP); Hirokazu Kobayashi, Osaka (JP); Kohki Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 123 days.

(21) Appl. No.: 13/382,198

(22) PCT Filed: Jul. 7, 2010

(86) PCT No.: PCT/JP2010/061502
§ 371 (c)(1),
(2), (4) Date: Jan. 25, 2012

(87) PCT Pub. No.: WO2011/004828
PCT Pub. Date: Jan. 13, 2011

(65) Prior Publication Data
US 2012/0135737 A1    May 31, 2012

(30) Foreign Application Priority Data
Jul. 7, 2009    (JP) ................................ P2009-160926

(51) Int. Cl.
*H04W 4/00*    (2009.01)
(52) U.S. Cl.
USPC ............... 455/435.2; 455/435.3; 455/436; 455/525; 455/512; 455/513; 455/444
(58) Field of Classification Search
USPC ................... 455/436–439, 435.2, 524–525; 370/331, 338
See application file for complete search history.

(56) References Cited

U.S. PATENT DOCUMENTS

| | | | | |
|---|---|---|---|---|
| 5,761,618 A | * | 6/1998 | Lynch et al. | 455/419 |
| 5,978,686 A | * | 11/1999 | Aoshima | 455/525 |
| 6,119,005 A | * | 9/2000 | Smolik | 455/436 |

(Continued)

FOREIGN PATENT DOCUMENTS

| | | |
|---|---|---|
| JP | 2004-159304 A | 6/2004 |
| JP | 2006-140689 A | 6/2006 |
| JP | 2007-43754 A | 2/2007 |
| JP | 2009-141945 A | 6/2009 |

OTHER PUBLICATIONS

3GPP TS 22.011 V8.5.0 (Sep. 2008), 3rd Generation Partnership Project; Technical Specification Group Services and System Aspects; Service accessibility (Release 8).
3GPP TS 36.304 V8.5.0 (Mar. 2009), 3rd Generation Partnership Project; Technical Specification Group Radio Access Network; Evolved Universal Terrestrial Radio Access (E-UTRA); User Equipment (UE) procedures in idle mode (Release 8).

(Continued)

*Primary Examiner* — Sharad Rampuria
(74) *Attorney, Agent, or Firm* — Birch, Stewart, Kolasch & Birch, LLP (57) ABSTRACT

The mobile station device has: a first step of selecting a plurality of base station devices meeting a predetermined handover condition, based on reception levels of a plurality of signals transmitted from the plurality of base station devices; and a second step of reselecting, if the plurality of base station devices selected in the first step include a plurality of base station devices for specific subscribers, a base station device to be accessed from among the plurality of base station devices for specific subscribers, by using a predetermined correlation between frequencies and priorities. Accordingly, the number of frequencies can be reduced, and the ping-pong phenomenon can be suppressed.

6 Claims, 7 Drawing Sheets

| CELL | CELL TYPE | FREQUENCY | RECEPTION LEVEL |
|---|---|---|---|
| CELL A0 | CELL FOR SPECIFIC SUBSCRIBERS | FREQUENCY C | RECEPTION LEVEL L2 |
| CELL A1 | CELL FOR SPECIFIC SUBSCRIBERS | FREQUENCY B | RECEPTION LEVEL L1 |
| CELL B0 | MACROCELL | FREQUENCY B | RECEPTION LEVEL L0 |
| CELL B1 | MACROCELL | FREQUENCY A | RECEPTION LEVEL L3 |

(56) References Cited

U.S. PATENT DOCUMENTS

| | | | |
|---|---|---|---|
| 6,298,235 B1* | 10/2001 | Bamburak et al. | 455/434 |
| 6,466,790 B2* | 10/2002 | Haumont et al. | 455/437 |
| 7,599,693 B2* | 10/2009 | Kuriyama | 455/434 |
| 7,634,272 B2* | 12/2009 | Yamashita et al. | 455/444 |
| 8,000,706 B2* | 8/2011 | Lee et al. | 455/435.2 |
| 8,229,432 B2* | 7/2012 | Fox et al. | 455/435.3 |
| 8,254,923 B2* | 8/2012 | Jung et al. | 455/434 |
| 8,265,685 B2* | 9/2012 | Vikberg et al. | 455/525 |
| 2005/0037798 A1* | 2/2005 | Yamashita et al. | 455/525 |
| 2010/0029274 A1* | 2/2010 | Deshpande et al. | 455/435.3 |
| 2010/0267385 A1 | 10/2010 | Iwamura et al. | |
| 2012/0329462 A1* | 12/2012 | Pica et al. | 455/437 |

OTHER PUBLICATIONS

3GPP TS 36.311 V8.5.0 (Mar. 2009), 3rd Generation Partnership Project; Technical Specification Group Radio Access Network; Evolved Universal Terrestrial Radio Access (E-UTRA), Radio Resource Control (RRC); Protocol specifiation (Release 8).
3GPP TSG-RAN WG2 Meeting #66bis, R2-093755, Proposed CR for hybrid cell (36.304), Jun. 29, 2009.
International Search Report mailed on Oct. 5, 2010.
R2-090810, Report of 3GPP TSG RAN WG2 meeting #64, held in Prague, Czech Republic, Nov. 10-14, 2008.

* cited by examiner

| FREQUENCY | ORIGINAL PRIORITY |
|---|---|
| FREQUENCY A | 7 |
| FREQUENCY B | 6 |
| FREQUENCY C | 5 |
| FREQUENCY D | 4 |

FIG. 4

| CELL | CELL TYPE | FREQUENCY | RECEPTION LEVEL |
|---|---|---|---|
| CELL A0 | CELL FOR SPECIFIC SUBSCRIBERS | FREQUENCY C | RECEPTION LEVEL L2 |
| CELL A1 | CELL FOR SPECIFIC SUBSCRIBERS | FREQUENCY B | RECEPTION LEVEL L1 |
| CELL B0 | MACROCELL | FREQUENCY B | RECEPTION LEVEL L0 |
| CELL B1 | MACROCELL | FREQUENCY A | RECEPTION LEVEL L3 |

| FREQUENCY | UPDATED PRIORITY |
|---|---|
| FREQUENCY A | 7 |
| FREQUENCY B | 8 |
| FREQUENCY C | 8 |
| FREQUENCY D | 4 |

CELL RESELECTING METHOD AND MOBILE STATION DEVICE

TECHNICAL FIELD

The present invention relates to a cell reselecting method and a mobile station device.

Priority is claimed on Japanese Patent Application No. 2009-160926, filed Jul. 7, 2009, the content of which is incorporated herein by reference.

BACKGROUND ART

Regarding W-CDMA (Wideband Code Division Multiple Access), LTE (Long Term Evolution), and LTE-A (LTE Advance), which are mobile communication standards, introducing a micro Home (e)Node B for expansion of service areas, personal use, or the like has been considered. Regarding the Home (e)NB, a UE (User Equipment) allowed to access a base station can be limited. The base station subjected to the limitation is referred to as a CSG (Closed Subscriber Group). Currently, standardization thereof is in progress by 3GPP (3rd Generation Partnership Project). The requirement for the Home (e)NB is defined in section 8 of Non-Patent Document 1.

Hereinafter, the 3GPP standard regarding the CSG is explained.

An owner or operator of the CSG can freely set the allowance or forbiddance of access to the CSG for each mobile station device. Additionally, a period of time for which an access to the CSG is allowed (hereinafter, expressed as an accessible time) can be set to a mobile station device to be allowed access. The accessible time is managed on the network side. If the accessible time expires, the mobile station device is forbidden to camp on the CSG cell. According to the standard of 3GPP Rel-8, if communication is in process when the accessible time expires, the communication call is forced to be disconnected.

If information concerning the allowance or forbiddance of access to the CSG is changed, that information is reported to the mobile station device. Based on this information, an allowed CSG list stored by the mobile station device is updated. However, the detailed procedure of updating the allowed CSG list has not been defined by the 3GPP.

When the mobile station device performs a handover to a CSG cell, the allowance or forbiddance of access to the CSG is determined by the following three steps.

Step 1) CSG identification information (CSG identity), which is reported by system information of the CSG cell, is obtained.

Step 2) It is confirmed whether or not the received CSG identification information is included in the allowed CSG list stored by the mobile station device.

Step 3) If the received CSG identification information is included, it is determined that access to the CSG cell is allowed. If the received CSG identification information is not included, it is determined that access to the CSG cell is not allowed.

In the case of LTE, each service frequency has a priority, which is taken in consideration when a peripheral cell is monitored and when cell reselection is evaluated. The correlation between service frequencies and priorities is included in and reported by system information from a base station device. The details of parameters reported by the system information are defined in Non-Patent Document 3.

The conditions for initiating monitoring a peripheral cell are defined in section 5.2.4.2 of Non-Patent Document 2 as follows.

1) If a frequency has a priority higher than that of a frequency of a serving cell: monitoring is always performed.

2) If a frequency has a priority equal to or lower than that of the frequency of the serving cell: monitoring is performed only when the reception quality of the serving cell becomes lower than a given threshold.

Additionally, a cell reselection evaluating method is defined in sections 5.2.4.5 and 5.2.4.6 of Non-Patent Document 2 as follows.

a) If a priority of a frequency of a cell to be subjected to reselection evaluation>a priority of a frequency of a serving cell: a handover to an evaluating cell is performed if the reception level of the evaluating cell ($S_{nonServingCell, x}$) is maintained higher than a threshold ($Thresh_{x, high}$) for a given period of time ($Treselection_{RAT}$).

b) If the priority of the frequency of the cell to be subjected to reselection evaluation=the priority of the frequency of the serving cell: cells are ranked according to the reception levels, and a handover to an evaluating cell is performed if a state, in which the rank of an evaluating cell exceeds the rank of the serving cell, is maintained for a given time ($Treselection_{RAT}$).

c) If the priority of the frequency of the cell to be subjected to reselection evaluation<the priority of the frequency of the serving cell: a handover to the evaluating cell is performed if a state, in which the reception level of the serving cell ($S_{ServingCell}$) is lower than a given threshold ($Thresh_{serving, low}$) and the reception level of the evaluating cell ($S_{nonServingCell, x}$) is higher than another threshold ($Thresh_{x, low}$), is maintained for the given time ($T_{reselectionRAT}$).

Regarding cell selection/reselection in the cases of the GSM, the W-CDMA, and the LTE, a concept for selecting a cell having the highest reception level, which is referred to as "best cell principle," is used. Additionally, in the case of the LTE, a frequency having a high priority at the time of cell search is always to be monitored. Further, as the priority is higher, the handover condition is more relaxed, thereby making a frequency having a higher priority be more likely to be selected. Regarding allocation of cells to one frequency band, there are following three patterns.

Pattern A) Only a CSG is allocated in the frequency.

Pattern B) Only a normal cell (i.e., macrocell) is allocated in the frequency.

Pattern C) A macro cell and a CSG are allocated in the frequency.

In 3GPP RAN 2 (TSG RAN WG2; Technical Specification Group Radio Access Network Working Group 2), it is agreed that an implicit priority is used at the time of cell reselection (Non-Patent Document 4). The concept of the implicit priority includes the following two rules.

Rule 1) If the reception level of a CSG is the highest in a frequency, the priority of that frequency is regarded to have the highest value.

Rule 2) If a serving cell is a CSG, the priority of a frequency thereof is regarded to have the highest value.

Regarding the introduction of the implicit priority, it has not been defined how to select a cell if a CSG is a cell having the highest reception level among multiple frequencies. It is agreed in RAN 2 that the implementation of operations in such a case are dependent on each mobile station device.

Different from the LTE, Patent Document 1 discloses a method in which a priority is set to each cell, and a terminal determines a handover destination based on the priorities of cells. In the case of the LTE, however, a priority is not set to a cell. Additionally, even if the priorities of frequencies are regarded as the priorities of cells, multiple CSGs have the same priority under such a condition that the implicit priority is used. For this reason, the conventional method cannot be applied.

CITATION LIST

[Patent Document]
[Patent Document 1] Japanese Unexamined Patent Application, First Publication No. 2007-43754
[Non-Patent Document]
[Non-Patent Document 1] 3GPP TS 22.011 v8.5.0: "Service accessibility"
[Non-Patent Document 2] 3GPP TS 36.304 v8.5.0: "User Equipment (UE) procedures in idle mode"
[Non-Patent Document 3] 3GPP TS 36.331 v8.5.0: "Radio Resource Control (RRC)-Protocol Specification"
[Non-Patent Document 4] R2-090810 "Report of 3GPP TSG RAN WG2 meeting #64"

DISCLOSURE OF THE INVENTION

Problems to be Solved by the Invention

As explained above, in the case of the LTE, a cell reselecting method for a case, where a CSG becomes a cell having the highest reception level among multiple frequencies, has not been defined. For this reason, in the case of the LTE, if a CSG becomes the best cell among multiple frequencies, and if such a selecting method that one of CSGs, which has the highest reception level, is selected based on the "best cell principle" is used, the following two problems arise.

If a mobile station device performs a handover to a CSG having the high reception level but a low frequency, and then performs a handover to a macrocell having the same frequency along with the degradation of the reception level of the CSG, it is necessary for the mobile station device to monitor a large number of other frequencies since the priority is low, as explained above. For this reason, there arises a problem of an increase in power consumption of the mobile station device.

Additionally, if a cell having a frequency with a low priority is reselected, a handover to another cell is performed along with the degradation of the reception level of the reselected cell. Then, if the reception level of the reselected cell increases, a handover to the reselected cell is performed again, thereby causing a problem in that handovers are frequently repeated, which is called a ping-pong phenomenon.

The present invention has been made in consideration of the above situations. An object of the present invention is to provide a cell reselecting method and a mobile station device for reducing the number of frequencies to be monitored and preventing the ping-pong phenomenon from occurring.

Means for Solving the Problems (1) The present invention has been made to solve the above problems. A cell reselecting method of the present invention is a cell selecting method for a mobile station device to reselect a base station device to be accessed from among a plurality of base station devices including a base station device for specific subscribers which limits mobile station devices to be allowed access thereto. The cell reselecting method includes: a first step of the mobile station device selecting a plurality of base station devices meeting a predetermined handover condition, based on reception levels of a plurality of signals transmitted from the plurality of base station devices; and a second step of the mobile station device reselecting, if the plurality of base station devices selected in the first step include a plurality of base station devices for specific subscribers, a base station device to be accessed from among the plurality of base station devices for specific subscribers, by using a predetermined correlation between frequencies and priorities.

(2) Additionally, the above cell reselecting method according to the present invention further includes: a third step of the mobile station device measuring the reception levels of the plurality of signals transmitted from the plurality of base station devices; and a fourth step of the mobile station device, if one of the plurality of base station devices associated with the same frequency, which has the highest reception level among the reception levels measured in the first step, is one of the plurality of base station devices for specific subscribers, updating to the highest priority, a priority correlated with a frequency associated with the one of the plurality of base station devices for specific subscribers, the priority and the frequency being included in the predetermined correlation. The mobile station device refers to, in the first step, a correlation updated in the fourth step to select the plurality of base station devices meeting the predetermined handover condition.

(3) Additionally, regarding the above cell reselecting method according to the present invention, the correlation in the second step is a correlation before the correlation is updated in the fourth step.

(4) Additionally, regarding the above cell reselecting method according to the present invention, if the plurality of base station devices selected in the first step include the plurality of base station devices for specific subscribers, and if the reception levels of the plurality of base station devices for specific subscribers are lower than a predetermined threshold, the mobile station device selects as the base station device to be accessed, in the second step, one of the plurality of base station devices for specific subscribers which has the highest reception level among the reception levels measured.

(5) Additionally, a mobile station device of the present invention is a mobile station device configured to reselect a base station device to be accessed from among a plurality of base station devices including a base station device for specific subscribers which limits mobile station devices to be allowed to access thereto. The mobile station device includes: a reselector configured to select, based on reception levels of a plurality of signals transmitted from the plurality of base station devices, a plurality of base station devices meeting a predetermined handover condition, and to reselect, if the plurality of base station devices selected include a plurality of base station devices for specific subscribers, a base station device to be accessed from among the plurality of base station devices for specific subscribers, by using a predetermined correlation between frequencies and priorities.

Effects of the Invention

According to the present invention, if a handover is performed by cell reselection, and then another handover to the base station device having the same frequency is performed due to the degradation of the reception level of the reselected cell, a decrease in priority can be suppressed, the number of frequencies to be monitored can be reduced, and the ping-pong phenomenon in which handovers are frequently repeated can be prevented.

BEST MODE FOR CARRYING OUT THE INVENTION (First Embodiment)

Figure 1:
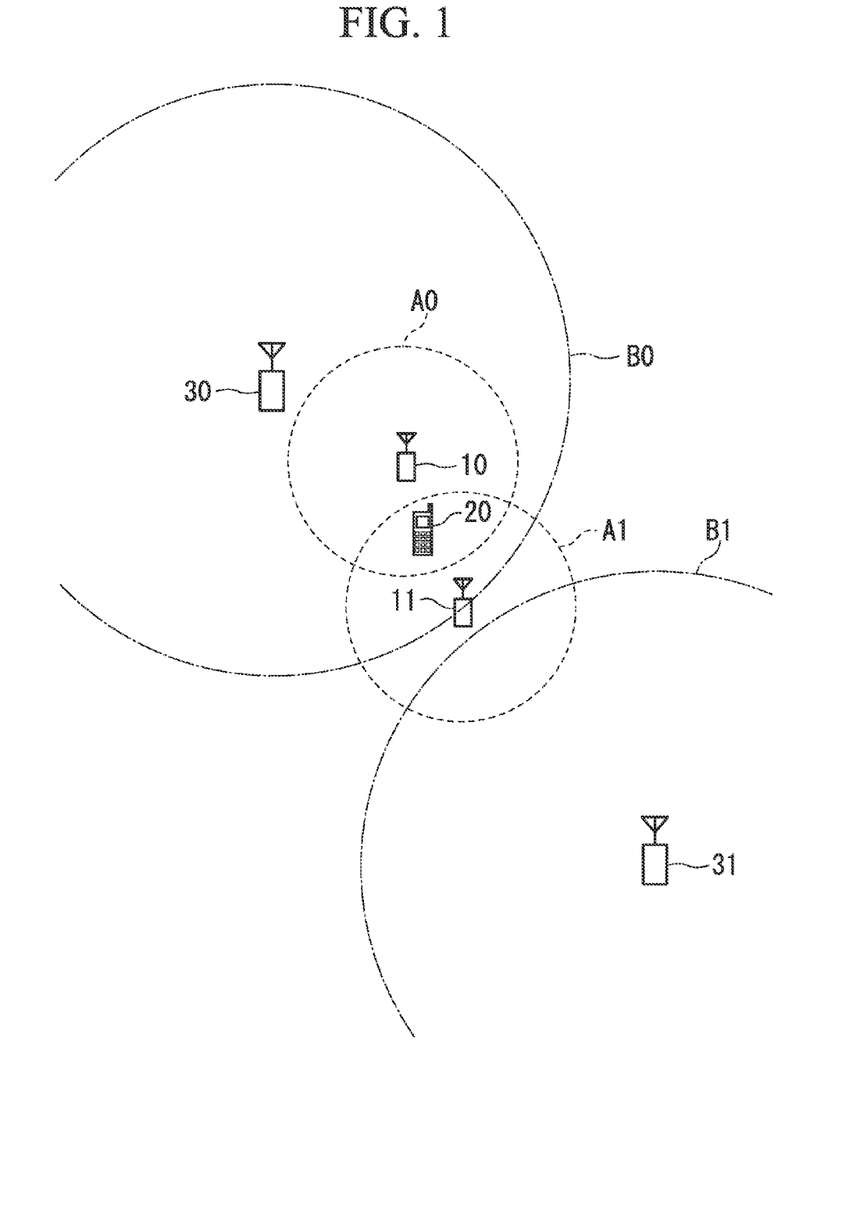
FIG. 1 is a schematic diagram illustrating a configuration of a mobile communication system according to a first embodiment of the present invention.

Hereinafter, a first embodiment of the present invention is explained with reference to the drawings. FIG. 1 is a schematic diagram illustrating a configuration of a mobile communication system according to the first embodiment of the present invention. The mobile communication system according to the first embodiment includes: base station devices for specific subscribers 10 and 11; base station devices 30 and 31; and a mobile station device 20. The base station device for specific subscribers 10 is a CSG (Closed Subscriber Group) that limits accessible mobile station devices. The base station device for specific subscribers 10 is a base station device having a coverage area of a cell A0. The base station device for specific subscribers 11 is a CSG that limits accessible mobile station devices. The base station device for specific subscribers 11 is a base station device having a coverage area of a cell A1. The base station device 30 is a base station device that does not limit accessible mobile station devices. The base station device 30 is a base station device having a coverage area of a macrocell B0. The base station device 31 is a base station device that does not limit accessible mobile station devices. The base station device 31 is a base station device having a coverage area of a macrocell B1. The mobile station device 20 is a mobile station device accessible to the base station devices for specific subscribers 10 and 11. Hereinafter, explanations are given under the assumption that the mobile station device 20 is present in an area in which the cell A0 served by the base station device for specific subscribers 10 overlaps the cell A1 served by the base station device for specific subscribers 11.

Figure 2:
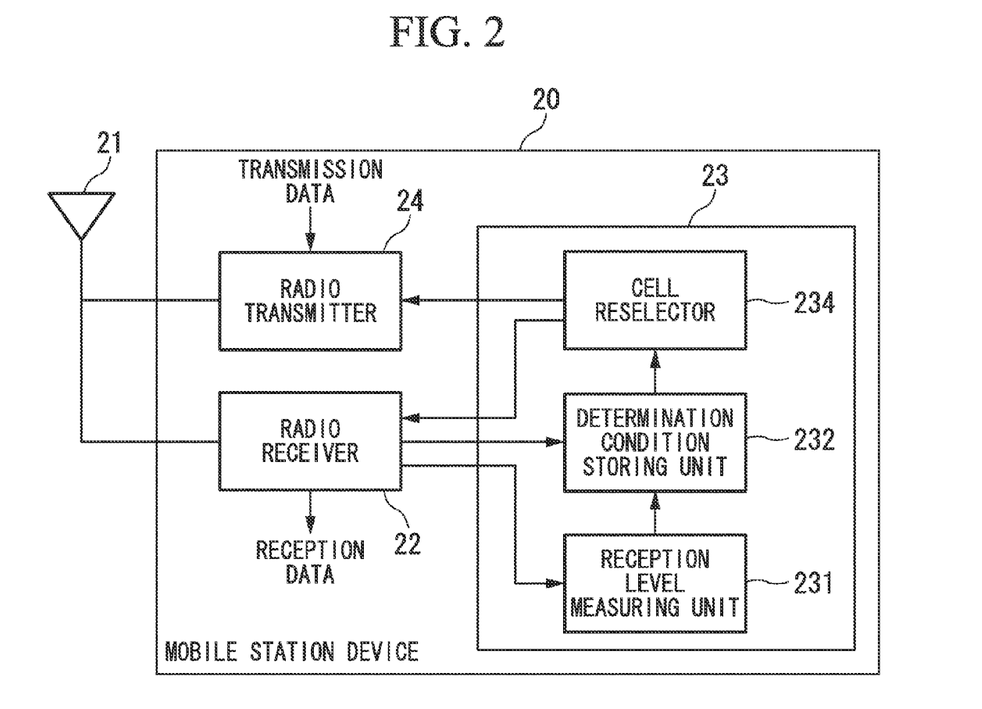
FIG. 2 is a schematic block diagram illustrating a configuration of a mobile station device 20 according to the first embodiment.

FIG. 2 is a schematic block diagram illustrating a configuration of the mobile station device 20 according to the first embodiment. The mobile station device 20 includes: an antenna 21; a radio receiver 22; a controller 23; and a radio transmitter 24. The controller 23 includes: a reception level measuring unit 231; a determination condition storing unit 232; and a cell reselector 234. The radio receiver 22 receives, through the antenna 21, a signal from a base station device associated with a frequency band according to the setting by the controller 23. The radio receiver 22 downconverts the received signal into a baseband frequency signal. Then, the radio receiver 22 performs demodulation to obtain reception data and control data. Among these data, the radio receiver 22 outputs the control data to the controller 23. The radio transmitter 24 modulates the control data received from the controller 23 and transmission data. Then, the radio transmitter 24 upconverts the modulated data into a frequency band signal according to the setting by the controller 23. Then, the radio transmitter 24 transmits the frequency band signal through the antenna 21. Thereby, the radio transmitter 24 transmits the control data and the transmission data to the base station device associated with the frequency band. The controller 23 determines a cell to be communicated with, as explained later. Further, the controller 23 sets a frequency band of the cell to the radio receiver 22 and the radio transmitter 24, so as to enable communication with the base station device serving the cell.

The reception level measuring unit 231 measures the reception levels of the serving cell and cells served by peripheral base stations, and causes the determination condition storing unit 232 to store the results of the measurement. Here, the reception level measuring unit 231 sets to the radio receiver 22, a frequency band of a cell to be measured. Then, the reception level measuring unit 231 calculates a signal to noise ratio (S/N) using a reference signal included in the frequency band, and regards the signal to noise ratio as the reception level. Similarly, the reception level measuring unit 231 may calculate a reference signal receive power (RSRP) using the reference signal included in the frequency band, and regard the reference signal receive power as the reception level. Alternatively, the reception level measuring unit 231 may use downlink pathloss calculated by using the RSRP, and an S value calculated from parameters reported by system information. Here, the reference signal is a signal known to the mobile station device 20.

The determination condition storing unit 232 stores frequency-priority information and peripheral cell information which are reported by a base station device through system information that is one type of control data. Additionally, the determination condition storing unit 232 stores cell information concerning a serving cell, and information indicating the reception level of each cell measured by the reception level measuring unit 231. Here, the frequency-priority information is information in which information indicating a frequency band (such as a center frequency, or the center frequency and a bandwidth) and information indicating an original priority (here, a value selected from 0 to 7, the priority is higher as the value increases) are correlated to each other. The peripheral cell information and the cell information are information in which information identifying a cell, the type of a cell, and information indicating a frequency band are correlated to one another. Here, the cell information is information concerning a serving cell. The peripheral cell information is information concerning a peripheral cell around the serving cell. The cell reselector 234 determines the necessity of cell reselection (reselection of a base station device to be accessed) based on the information stored by the determination condition storing unit 232. The cell reselector 234 determines a cell to be reselected, based on the information stored by the determination condition storing unit 232. The details of a reselection necessity determining method and a cell reselecting method are explained later.

Figure 3:
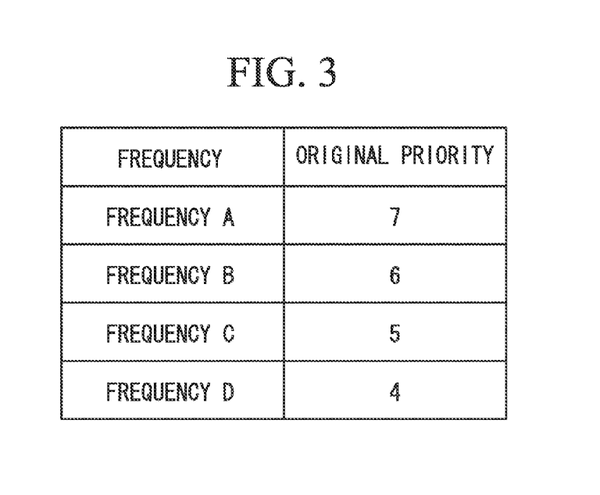
FIG. 3 is a diagram illustrating an example of contents of a frequency-priority table stored by the determination condition storing unit 232 according to the first embodiment.

FIG. 3 is a diagram illustrating an example of contents of a frequency-priority table stored by the determination condition storing unit 232 according to the first embodiment. The frequency-priority table stores, for each row, frequency-priority information (first correlation) in which a center frequency indicating a frequency band, and an original priority are correlated with each other. For example, a first row stores a frequency A and an original priority "7." A second row stores a frequency B and an original priority "6." A third row stores a frequency C and an original priority "5." A fourth row stores a frequency D and an original priority "4."

Figure 4:
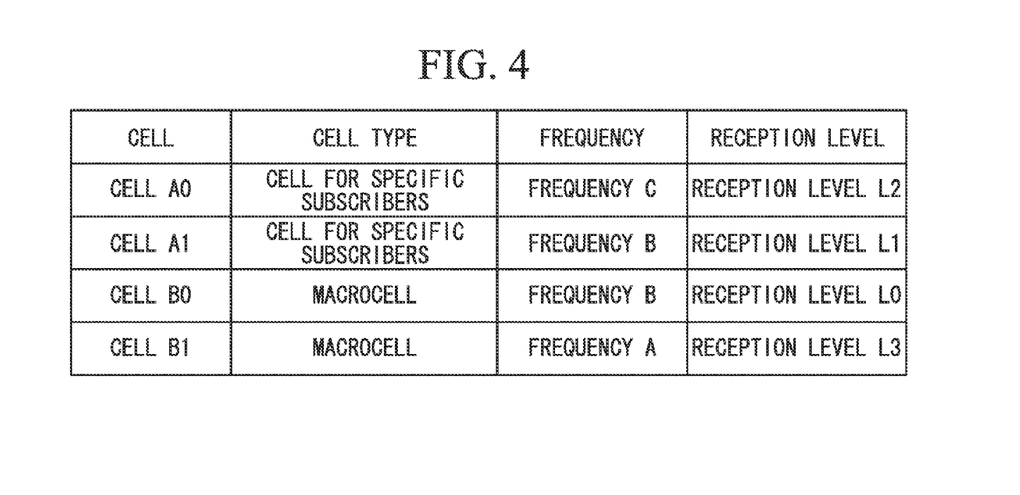
FIG. 4 is a diagram illustrating an example of contents of a cell information table stored by the determination condition storing unit 232 according to the first embodiment.

FIG. 4 is a diagram illustrating an example of contents of a cell information table stored by the determination condition storing unit 232 according to the first embodiment. The cell information table stores, for each row, identification information of a cell, the type of the cell, a center frequency indicating a frequency band of the cell, and the reception level of the cell, which are correlated with one another. For example, a first row stores the cell identifier of "cell A0," the cell type of "cell for specific subscribers," the frequency C, and the reception level L2. A second row stores the cell identifier of "cell A1," the cell type of "cell for specific subscribers," the frequency B, and the reception level L1. A third row stores the cell identifier of "cell B0," the cell type of "macrocell," the frequency B, and the reception level L0. A fourth row stores the cell identifier of "cell B1," the cell type of "macrocell," the frequency A, and the reception level L3. In other words, the cell information table stores, for each row, cell information and the reception level of a serving cell, or peripheral information and the reception level of a peripheral cell. It is assumed in FIG. 4 that the reception level L3>the reception level L2>the reception level L1>the reception level L0.

Figure 5:
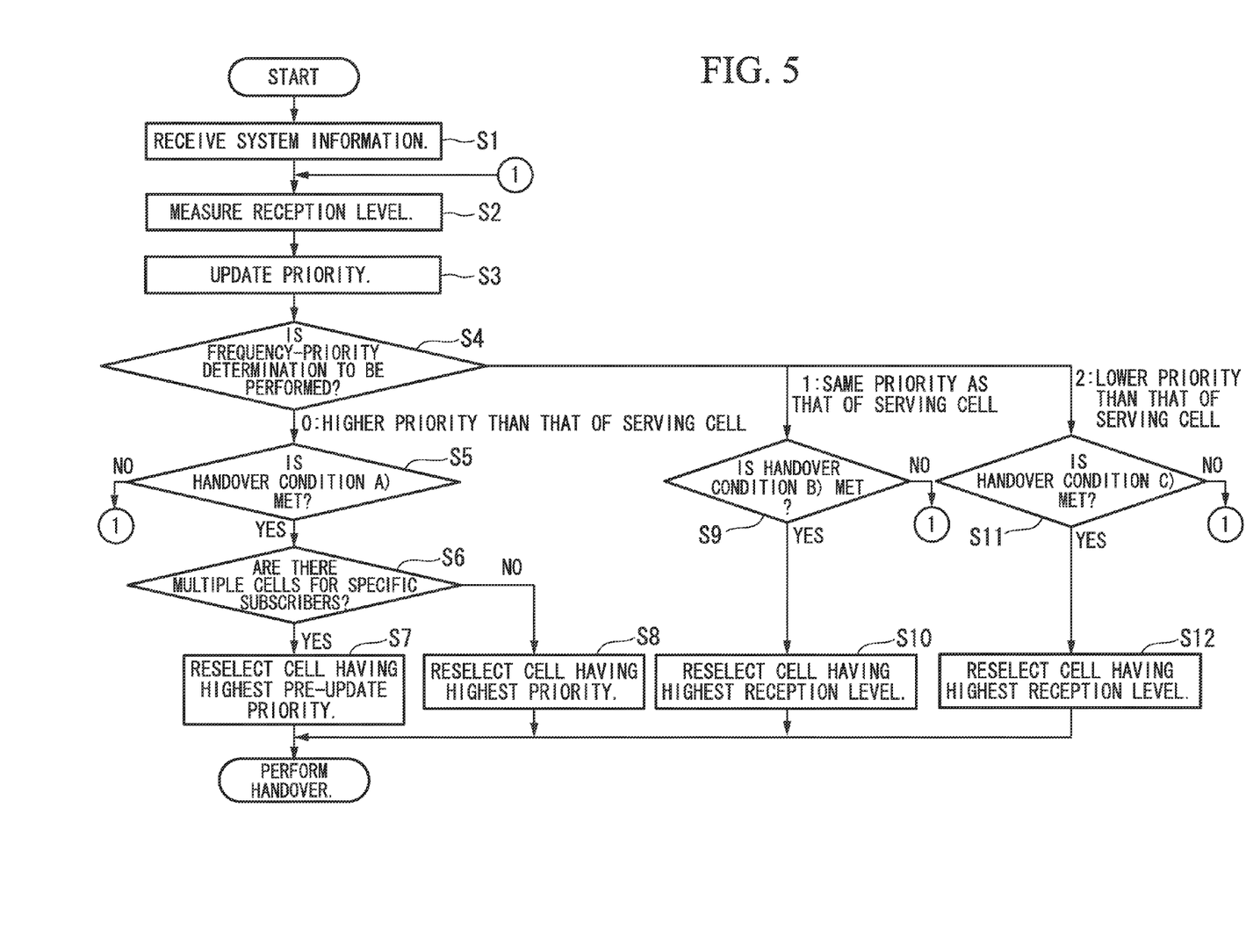
FIG. 5 is a flowchart illustrating a reselection necessity determining method and a cell reselecting method for the controller 23 according to the first embodiment.

FIG. 5 is a flowchart illustrating the reselection necessity determining method and the cell reselecting method for the controller 23 according to the first embodiment. It is assumed here that the mobile station device 20 camps on the cell B1, obtains cell information when performing position registration to the base station device 30, and stores the cell information in the determination condition storing unit 232. First, the radio receiver 22 of the mobile station device 20 receives, through the antenna 21, system information transmitted from the base station device 31 serving the cell B1 (S1). Then, the radio receiver 22 outputs the system information to the determination condition storing unit 232. Among the received system information, the determination condition storing unit 232 stores at least frequency-priority information and peripheral cell information.

Then, the reception level measuring unit 231 measures the reception level of each cell stored in the cell information table stored by the determination condition storing unit 232 (S2). Thereby, the reception levels of the serving cell and peripheral cells are measured. The reception level measuring unit 231 stores the measurement results in the cell information table.

Then, the cell reselector 234 reads and temporarily stores the frequency-priority table stored in the determination condition storing unit 232. Additionally, the cell reselector 234 refers to the cell information table with respect to each frequency stored in the table, and obtains the type of a cell having the highest reception level among the cells associated with the respective frequencies. The cell reselector 234 updates the original priority to the updated priority "8" indicating the highest priority, with respect to a frequency associated with a cell having the obtained cell type of the cell for specific subscribers, which is previously read and temporarily stored in the frequency-priority table. With respect to other frequencies, the cell reselector 234 updates the original priority to an updated priority having the same value as that of the original priority (S3).

For example, with reference to the cell information table shown in FIG. 4, regarding the frequency B, the reception level of the cell A1 that is the cell for specific subscribers is L1, the reception level of the cell B0 that is the macrocell is L0, and the reception level L1>the reception level L0. Accordingly, among cells associated with the frequency B, the cell having the highest reception level is the cell A1. The cell type of the cell A1 is the "cell for specific subscribers." Therefore, the cell reselector 234 sets "8" to the updated priority of frequency B. Additionally, a cell associated with the frequency C is only cell A0. The cell type of the cell A0 is the "cell for specific subscribers." Therefore, the cell reselector 234 updates the original priority of the frequency C to the updated priority of "8."

Figure 6:
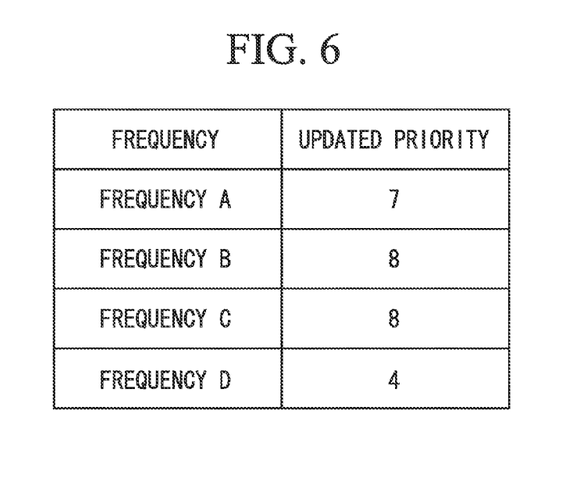
FIG. 6 is a diagram illustrating an example of contents of an updated frequency-priority table temporarily stored by a cell reselector 234 according to the first embodiment.

On the other hand, regarding the frequency A, a cell associated with the frequency A is only the cell B1. For this reason, the cell having the highest reception level, which is associated with the frequency A, is the cell B1. The cell type of the cell B1 is "macrocell," not "cell for specific subscribers." Therefore, an updated priority of the frequency A is kept identical to the original priority "7." Regarding the frequency D, there is no cell associated with the frequency D. For this reason, an updated priority of the frequency D is kept identical to the original priority of "4." Accordingly, after the process in step S3 is performed, the frequency-priority table temporarily stored by the cell reselector 234 stores the following correlations, as shown in FIG. 6. The updated priority "7" is correlated with the frequency A. The updated priority "8" is correlated to the frequency B. The updated priority "8" is correlated to the frequency C. The updated priority "4" is correlated with the frequency D.

Then, the cell reselector 234 performs a cell reselection evaluation. As explained above, handover conditions are determined from the priorities of the serving cell and evaluating cells. For this reason, the cell reselector 234 refers to the frequency-priority table that is temporarily stored and updated, and the cell information table stored by the determination condition storing unit 232, and thereby performs frequency-priority determination for comparing the priority of the serving cell and the priorities of the peripheral cells (S4). Here, the serving cell is the cell B1 associated with the frequency A. Therefore, the updated priority is "7" according to the FIG. 6. The evaluating cell is a cell having the highest reception level with respect to each frequency. The cell A1 associated with the frequency B and the cell A0 associated with the frequency C are the evaluating cells. As shown in FIG. 6, the updated priorities of the frequencies B and C are updated to "8" in the step S3. For this reason, it is determined in the frequency-priority determination that the priorities of the peripheral cells are higher than that of the serving cell.

If it is determined in step S4 that the priority is higher than that of the serving cell (S4—0), the procedure proceeds to step S5. In step S5, the cell reselector 234 determines whether or not the reception levels of the evaluating cells (and serving cell) meet the handover condition. In the first embodiment, the evaluating cell is higher in priority than the serving cell. For this reason, the handover condition a) is used.

Handover condition a) The following expression is continuously met for $T_{reselection_{RAT}}$.

$$S_{NonServingCell,x} > Thresh_{x,high} \qquad (1)$$

In the handover condition 1), $S_{NonServingCell,x}$ denotes the reception level of a peripheral cell x. $Thresh_{x,high}$ denotes a threshold reported from the serving base station device through system information. Treselection$_{RAT}$ denotes a determination period reported from the serving base station device through the system information.

If it is determined in step S5 that there is a cell meeting the handover condition a) (S5—Yes), the procedure proceeds to step S6. In step S6, the cell reselector 234 selects a cell having the cell type of "cell for specific subscribers" from among the cells determined in the previous step to meet the handover condition. Then, the cell reselector 234 determines whether or not there are multiple selected cells. If it is determined in step S6 that there are multiple selected cells (S6—Yes), the cell reselector 234 refers to the frequency-priority table stored by the determination condition storing unit 232, and reselects the cell having the highest original priority from among the cells selected in step S6 (S7), and the handover process ends. In other words, in step S7, among the cells selected in step S6, the cell having the priority that is the highest before the updating in step S3 is regarded as a cell to be reselected, and the handover process ends.

Additionally, if it is determined in step S6 that there is not multiple selected cells, in other words, if there is no or one cell having the cell type of "cell for specific subscribers" among the cells determined to meet the handover condition (S6—No), the cell reselector 234 refers to the frequency-priority table that is temporarily stored in step S3 and updated, and regards, as a cell to be reselected, the cell having the highest updated priority among the cells determined to meet the handover condition, and the handover process ends. If there are multiple cells having the same updated priority, in other words, if the multiple macrocells meet the handover condition and have the same priority, the cell having the highest reception level is regarded as a cell to be reselected, according to the 3GPP standard.

Additionally, if it is determined in step S4 that the priority of the evaluating cell is identical to that of the serving cell (S4-1), and if the priority of the evaluating cell is lower than that of the serving cell (S4-2), cell reselection evaluation is performed using the aforementioned handover conditions b) and c), respectively (S9 to S12). The operations thereof are as explained above.

If it is determined in step S5 that there is no cell meeting the handover condition a) (S5-No), the procedure returns to the step S2, and the process repeats.

Thus, if there are multiple cells having the type of "for specific subscribers" in step S6, a handover destination cell is selected in step S7 based on the original priorities, not on the updated priorities. Accordingly, a reduction in the reception level of the reselected cell after the handover by means of cell reselection, and a decrease in priority after another handover to a macrocell having the same frequency, can be prevented. The number of frequencies to be measured can be reduced, and the ping-pong phenomenon can be prevented from occurring.

It is most preferable to select, in step S7, a handover destination cell based on the original priorities. However, a handover destination cell may be selected based on another correlation between frequencies and priorities (second correlation).

(Second Embodiment)

Hereinafter, a second embodiment of the present invention is explained with reference to the drawings. In the first embodiment, if multiple base station devices for specific subscribers meet the cell reselection condition, selection is made in consideration of only frequencies and priorities. In the second embodiment, if there is clear difference in the reception level between the base station device for specific subscribers associated with a frequency having a low priority and the base station device for specific subscribers associated with a frequency having a high priority, the base station device for specific subscribers associated with the frequency having the high priority is selected in consideration of the communication speed after cell reselection, and the transmission power of the mobile station device. For this reason, in the second embodiment, in addition to the operations of the first embodiment, whether a cell to be reselected is determined in consideration of frequencies and priorities or in consideration of only the reception levels without consideration of the frequencies and priorities is switched according to the reception level of the base station device for specific subscribers.

Figure 7:
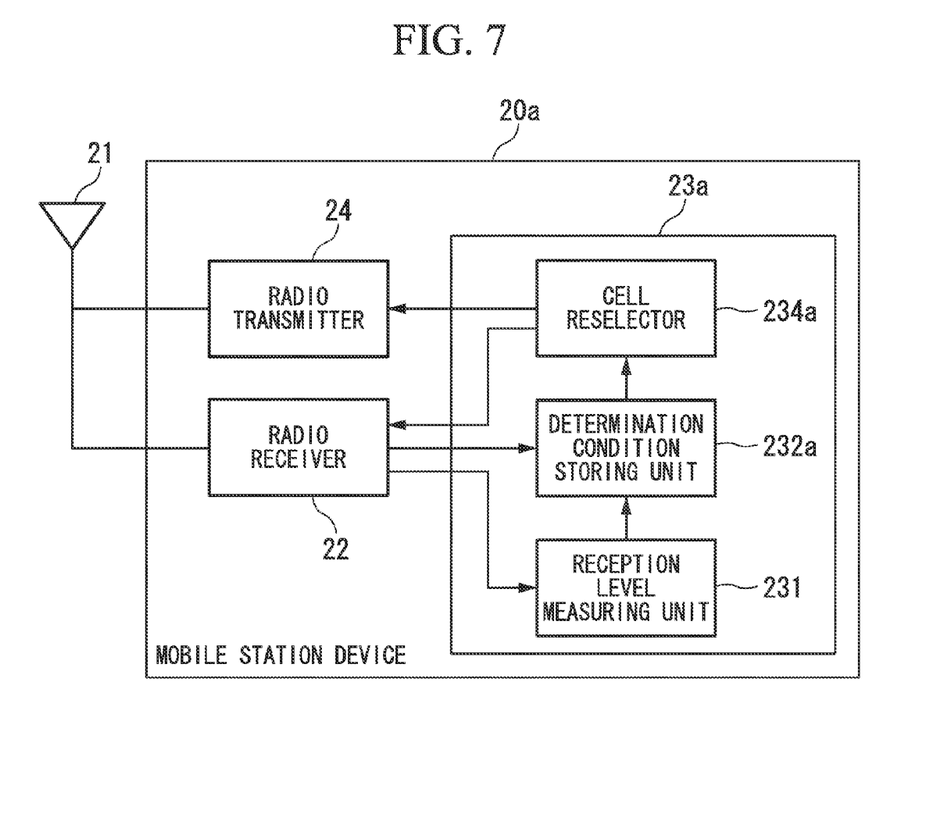
FIG. 7 is a schematic block diagram illustrating a configuration of a mobile station device 20a according to a second embodiment of the present invention.

FIG. 7 is a schematic block diagram illustrating a configuration of a mobile station device 20a according to the second embodiment. In FIG. 7, the mobile station device 20a includes: an antenna 21; a radio receiver 22; a controller 23a; and a radio transmitter 24. The controller 23a includes: the reception level measuring unit 231; a determination condition storing unit 232a; and a cell reselector 234a. The same reference numerals (21, 22, 24, and 231) are appended to elements shown in FIG. 7 corresponding to the respective elements shown in FIG. 2, and explanations thereof are omitted here.

The determination condition storing unit 232a stores a threshold Th$_{reselect}$ for switching the cell reselecting methods, in addition to the frequency-priority information and the peripheral cell information which are stored by the determination condition storing unit 232 shown in FIG. 2. The threshold Th$_{reselect}$ may be uniquely owned by the mobile station device 20a or specified by the base station device through system information.

If there is a base station device for specific subscribers which has the reception level equal to or greater than the threshold Th$_{reselect}$ at the time of cell reselection, the cell reselector 234 selects, as a handover destination, one of those base station devices for specific subscribers, which has the highest original priority. On the other hand, if there is no base station device for specific subscribers which has the reception level equal to or greater than the threshold Th$_{reselect}$, the cell reselector 234 selects, as a handover destination, the base station device for specific subscribers which has the highest reception level, without consideration of the priorities.

Figure 8:
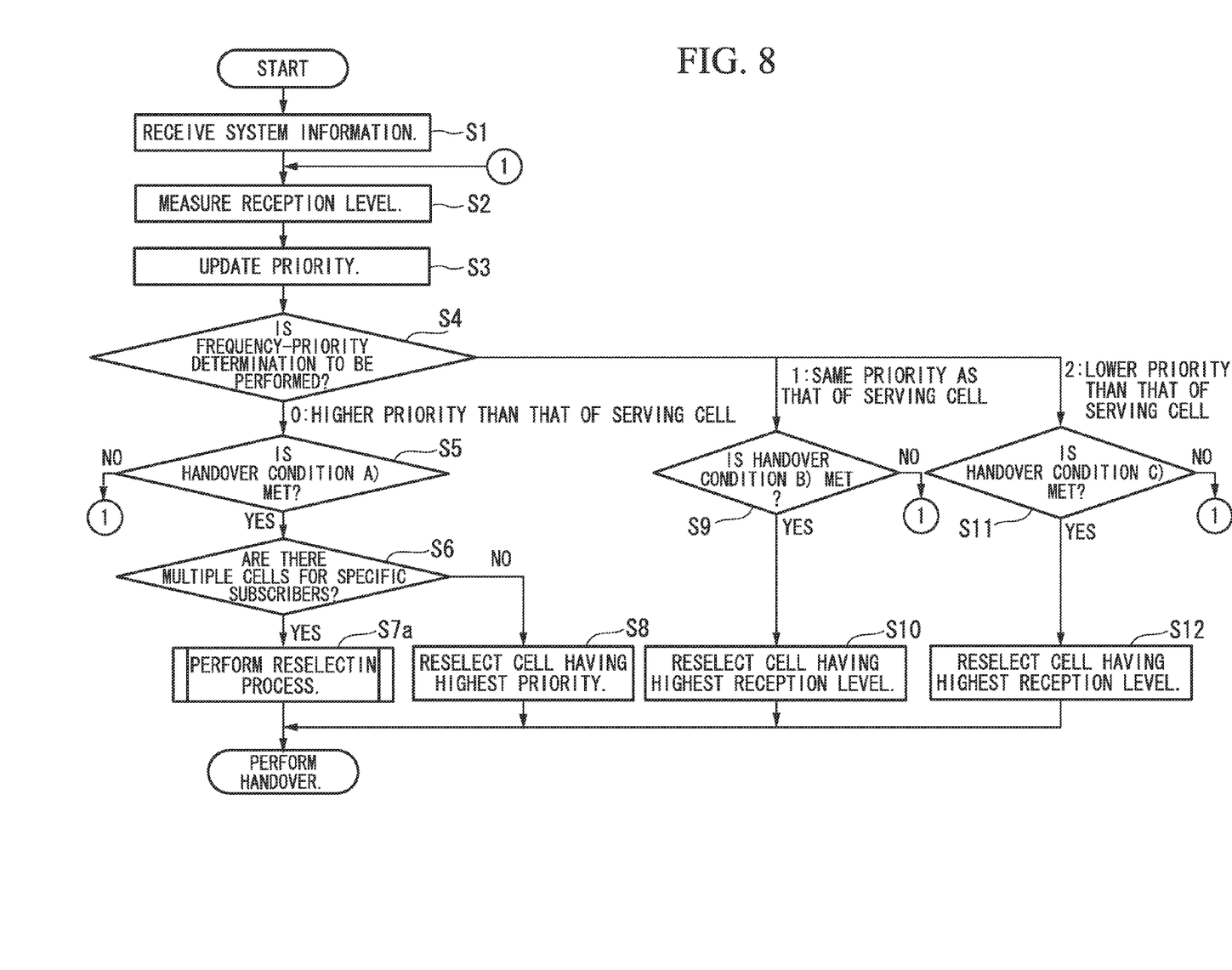
FIG. 8 is a flowchart illustrating a process for a controller 23a to determine a cell to be reselected according to the second embodiment.

FIG. 8 is a flowchart illustrating a process for the controller 23a to determine a cell to be reselected according to the second embodiment. In FIG. 8, the same reference numerals (S1 to S6, and S8 to S12) are appended to steps shown in FIG. 8 corresponding to the respective steps shown in FIG. 5, and explanations thereof are omitted her. As shown in FIG. 8, the process of the second embodiment for determining a cell to be reselected differs from that of the first embodiment only in that a step S7a is included in lieu of the step S7 shown in FIG. 5.

Figure 9:
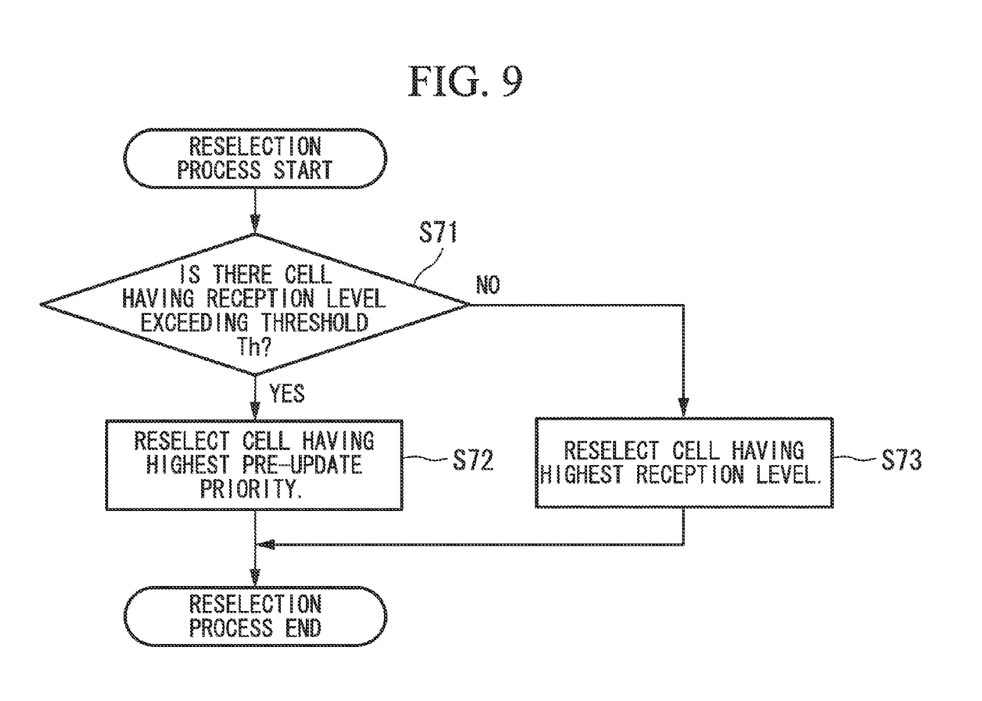
FIG. 9 is a flowchart illustrating a reselection process according to the second embodiment.

FIG. 9 is a flowchart illustrating the reselection process, that is, the step S7a shown in FIG. 8 according to the second embodiment. In step S71, the cell reselector 234 determines whether or not there is a base station device having the reception level exceeding the threshold Th$_{reselect}$ among the base station devices having the cell type of the "cell for specific subscribers," which are selected in step S6 shown in FIG. 8. If it is determined that there is such a base station device exceeding the threshold (S71—Yes), the cell reselector 234 refers to the frequency-priority table stored by the determination condition storing unit 232, and reselects the cell having the highest original priority among the base station devices determined in step S71 to exceed the threshold, and the reselection process ends. On the other hand, if it is determined in step S71 that there is no such base station device that exceeds the threshold (S71—No), the cell reselector 234 reselects the cell having the highest reception level among the base station devices having the cell type of for specific subscribers, which are selected in step S6 (S73), and the reselection process ends.

Accordingly, when $S_A$, $S_B$, and $S_C$ respectively denote the reception levels of the base station devices A, B, and C having the cell type of "cell for specific subscribers," and the order of the original priorities of frequencies is such that the base station device A>the base station device B>the base station device C, the mobile station device 20a performs reselection as follows.

(If Reception Levels are such that $S_C > S_A > Th_{reselect} > S_B$)

In step S72, the mobile station device selects, according to the original priorities, the base station device A from the base station devices A and C that have the reception levels exceeding the threshold $Th_{reselect}$.

(If Reception Levels are such that $Th_{reselect} > S_B > S_C > S_A$)

In step S73, the mobile station device selects, without consideration of the original priorities, the base station device B having the highest reception level.

Thus, if there are multiple cells having the type of "for specific subscribers" among the cells meeting the handover condition, and if there is no cell among these cells which has the reception level exceeding the threshold $Th_{reselect}$, the cell having the highest reception level is selected as a handover destination cell while reducing as much possibility as possible that cell reselection will have to be performed during access to the handover destination cell. If there is a cell having the reception level exceeding the threshold $Th_{reselect}$, a handover destination cell is selected based on the original priorities. Accordingly, a reduction in the priority after the handover, and a decrease in the priority when a handover to the macrocell having the same frequency is performed, can be suppressed. Further, the number of frequencies to be measured can be reduced, and the ping-pong phenomenon can be prevented from occurring.

It has been explained in the first and second embodiments that the original priorities of frequencies are reported by means of system information according to the LTE standard. However, the original priorities may be reported from a base station device by means of another message (such as a dedicated signaling), or be determined uniquely by the mobile station devices 20 or 20a.

Additionally, the priorities of frequencies may be set for each component carrier (which is the channel defined by 3GPP TS 36.101, and has such a bandwidth as 5 MHz or 10 MHz) or for each frequency band (which is the frequency band defined by 3GPP TS 25.101 or the operating band defined by TS 36.101).

A computer readable recording medium may record a program for implementing the cell reselector 234 shown in FIG. 2 and the cell reselector 234a shown in FIG. 7, so that the process for each unit is performed by a computer system reading and executing the program recorded in the recording medium. The "computer system" includes OS and hardware, such as a peripheral device.

Further, the "computer readable recording medium" includes a portable medium such as a flexible disc, a magneto-optical disc, a ROM, and a CD-ROM, and a storage device such as a hard disk built in the computer system. The "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Additionally, the program may be a program for implementing part of the aforementioned functions. Further, the program may be a program that can implement the aforementioned functions in combination with a program already recorded on the computer system.

Although the embodiments of the present invention have been explained with reference to the drawings, specific configurations are not limited thereto. Various design modifications may be made-without departing from the scope of the present invention.

DESCRIPTION OF REFERENCE NUMERALS 10 and 11: base station device for specific subscribers
20 and 201: mobile station device
21: antenna
22: radio receiver
23 and 23a: controller
231: reception level measuring unit
232 and 232a: determination condition storing unit
234 and 234a: cell reselector
24: radio transmitter
30 and 31: base station device

The invention claimed is:

1. A cell reselecting method for a mobile station device, the cell reselecting method comprising:
measuring reception levels of a plurality of signals transmitted from a plurality of base station devices including a first base station device serving the mobile station device and a plurality of second base station devices which limit mobile station devices to be allowed access thereto;
determining, for each of frequencies of the plurality of base station devices, one of the plurality of base station devices associated with the highest reception level, the frequencies being prioritized previously;
in a case that the one of the plurality base station devices associated with the highest reception level is one of the plurality of second base station devices, updating a priority of a frequency of the one of the plurality of base station devices to the highest priority;
selecting, from the plurality of base station devices, at least one handover destination base station devices based on the reception levels and the priorities updated; and
in a case that the at least one handover destination base station devices selected include two or more second base station devices having frequencies higher in priority than a frequency of the serving base station device and meeting a first handover condition, reselecting from the two or more second base station devices a first handover destination base station device having a frequency with the highest priority pre-updated.

2. The cell reselecting method according to claim 1, further comprising:
in a case that the at least one handover destination base station devices selected includes one or no second base station device, reselecting from the at least one base station devices meeting the first handover condition, a third handover destination base station device having a frequency with the highest priority updated.

3. The cell reselecting method according to claim 1, further comprising:
in a case that the at least one handover destination base station devices selected have frequencies lower in priority than, or equal in priority to, a frequency of the serving base station device and meet a second handover condition, reselecting from the at least one handover destination base station devices meeting the second handover condition, a fourth destination base station device associated with the highest reception level.

4. The cell reselecting method according to claim 1, wherein reselecting the first handover destination base station device comprises, in a case that the two or more second base station devices include two or more fifth base station devices associated with reception levels higher than a first threshold, reselecting from the two or more fifth base station devices, a sixth handover destination base station device associated with the highest priority pre-updated.

5. The cell reselecting method according to claim 4, wherein reselecting the first handover destination base station device comprises, in a case that the two or more second base station devices include no handover destination base station device associated with reception levels higher than the first threshold, reselecting from the two or more second base station devices, a seventh handover destination base station device associated with the highest reception level.

6. A mobile station device comprising:
a measurer configured to measure reception levels of a plurality of signals transmitted from a plurality of base station devices including a first base station device serving the mobile station device and a plurality of second base station devices which limit mobile station devices to be allowed access thereto;
a reselector configured to
determine, for each of frequencies of the plurality of base station devices, one of the plurality of base station devices associated with the highest reception level, the frequencies being prioritized previously,
in a case that the one of the plurality base station devices associated with the highest reception level is one of the plurality of second base station devices, updating a priority of a frequency of the one of the plurality of base station devices to the highest priority,
select from the plurality of base station devices, at least one handover destination base station devices based on reception levels and the priorities updated, and
in a case that the at least one handover destination base station devices selected include two or more second base station devices having frequencies higher in priority than a frequency of the serving base station device and meeting a first handover condition, reselect from the two or more second base station devices, a first handover destination base station device having a frequency with the highest priority pre-updated.

* * * * *